United States Patent [19]

Langerud

[11] 4,431,074
[45] Feb. 14, 1984

[54] CRANE CARBODY AND LOWER AXLE CONSTRUCTION

[75] Inventor: David S. Langerud, Solon, Iowa

[73] Assignee: FMC Corporation, Chicago, Ill.

[21] Appl. No.: 342,299

[22] Filed: Jan. 25, 1982

[51] Int. Cl.³ .............................................. B62D 55/10
[52] U.S. Cl. .............................. 180/9.48; 180/DIG. 2
[58] Field of Search ............ 180/9.48, 9.2 R, DIG. 2; 52/115, 118; 212/268, 269, 270

[56] References Cited

U.S. PATENT DOCUMENTS

| | | | |
|---|---|---|---|
| 2,074,685 | 3/1937 | Engstrom | 180/DIG. 2 |
| 2,763,330 | 9/1956 | Potter | 180/9.48 |
| 3,749,193 | 7/1973 | Blase et al. | 180/9.48 |
| 3,820,616 | 6/1974 | Juergens | 180/9.48 |

FOREIGN PATENT DOCUMENTS 1048722 11/1966 United Kingdom .............. 180/9.48

Primary Examiner—Joseph F. Peters, Jr.
Assistant Examiner—D. Lynn Fugate
Attorney, Agent, or Firm—Ronald C. Kamp; Richard B. Megley

[57] ABSTRACT

A construction for a crane carbody and lower axle construction which permits use of either fixed or adjustable length axles with common tread members and carbodies, each of the tread members having sockets and a pair of adjustable length axles, each axle having a pair of side by side hydraulic rams, defining an offset therebetween connected to axle beams engageable with and secured to said sockets. A pair of fixed length axles, each having beam ends which are out of alignment by an amount equal to said offset so that the fixed and adjustable length axles are interchangeable.

3 Claims, 4 Drawing Figures

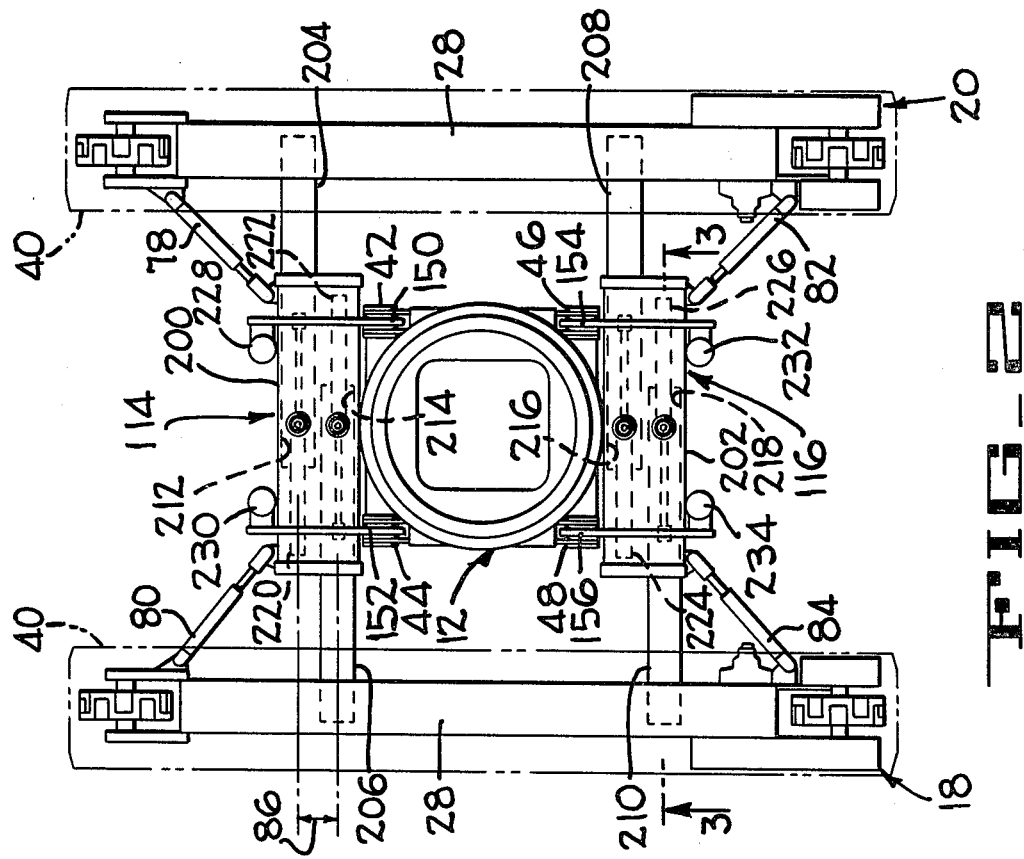
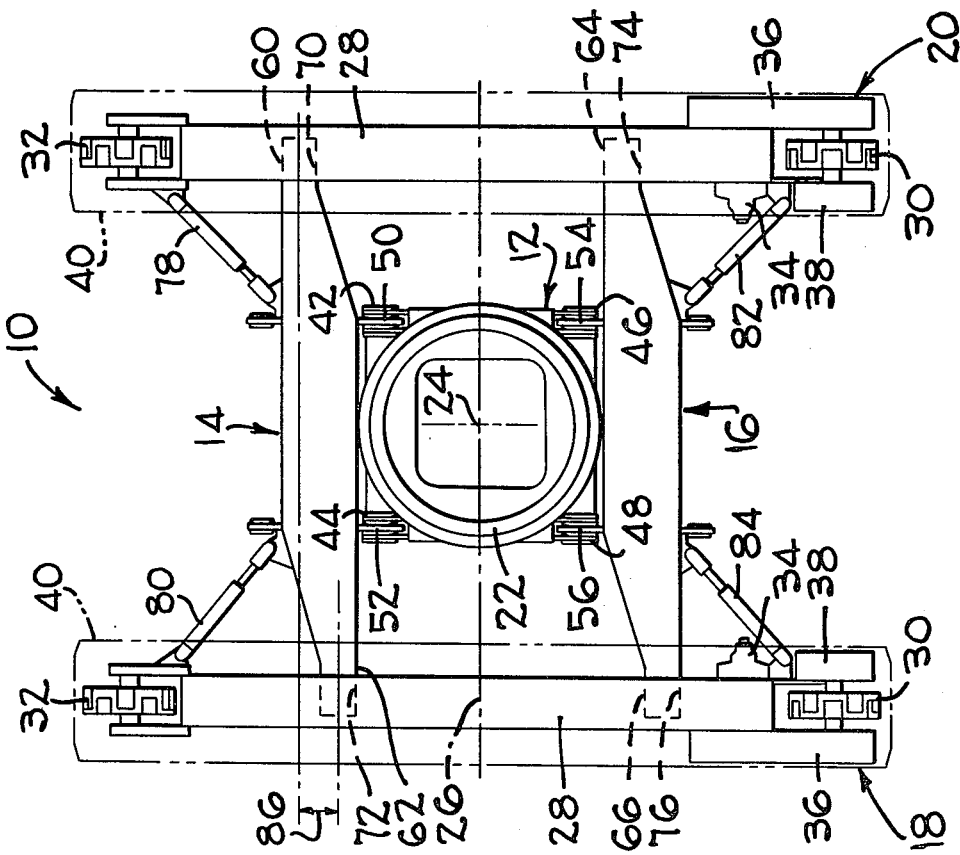

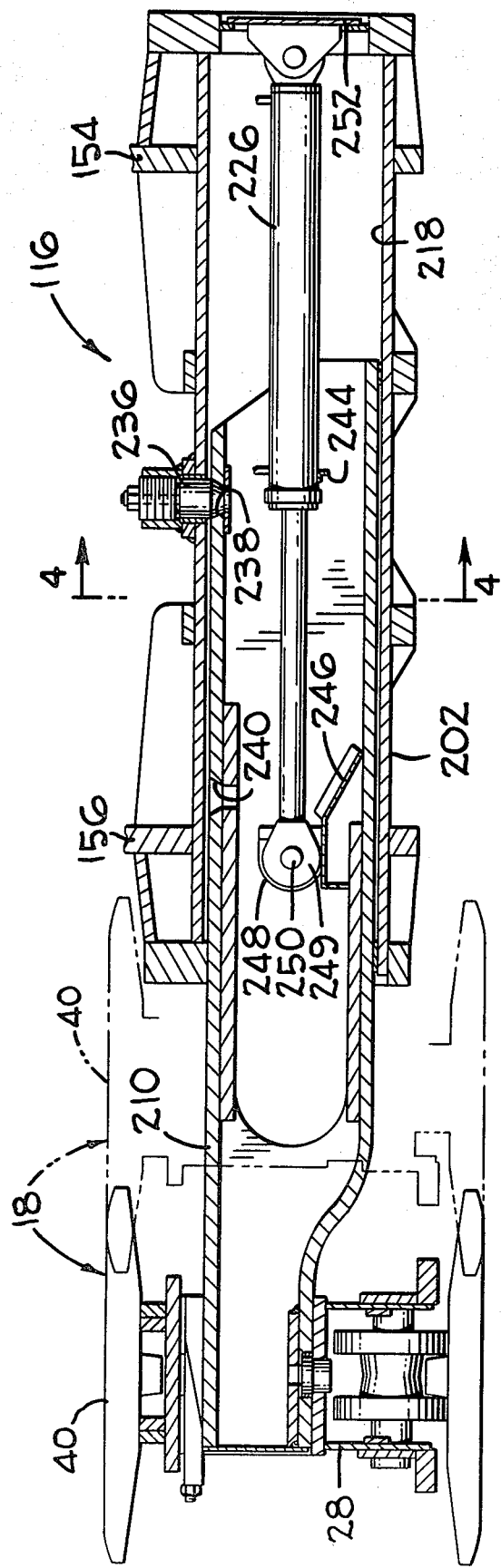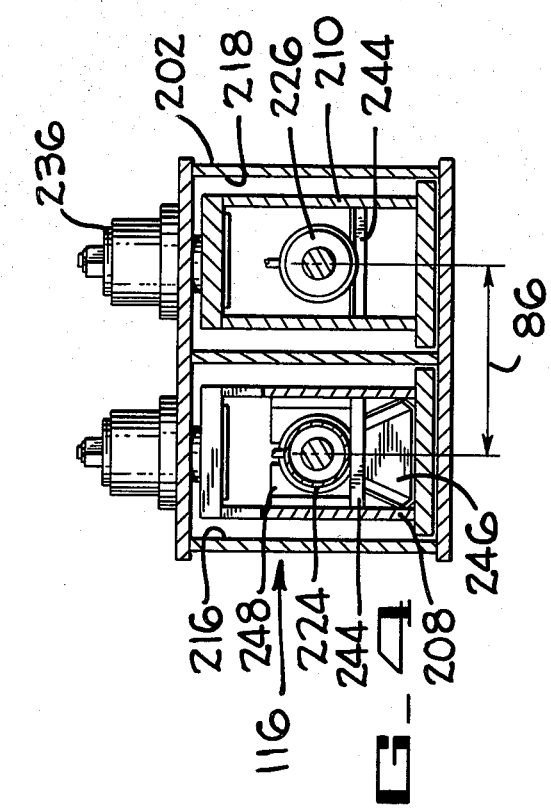

CRANE CARBODY AND LOWER AXLE CONSTRUCTION

BACKGROUND AND SUMMARY OF THE INVENTION

The capacity of the crane, i.e. its ability to lift a load, is based, in part, on its stability. Stability, in turn, is related to the gage or spacing between the tread members. A wide gage will improve stability and hence generally incrase capacity. However, a wide gage can restrict the mobility of the crane on certain job sites. The virtues of both wide gage (improve stability) and narrow gage (improve mobility) have been satisfactorily attained by prior art arrangements permitting adjustment of axle length. However, such arrangements are expensive and some applications of cranes do not require such capability. For those applications, a fixed length axle is acceptable and has been widely utilized. Thus, the same crane model often must be produced in two versions; one with adjustable axle length and one with fixed axle length. This requirement has necessitated different car bodies and tread members in addition to different axles for the same model crane. As a consequent, certain economies of scale are lost and the cost of manufacturing both versions of the same model of crane is high.

The present invention provides a construction in which the fixed and adjustable length axles may be readily utilized with a common car body and common tread members, so that the desired economies of scale can be attained with respect to the use of those components. The invention also provides a construction for the axles which permits a single axle of each type to be used for both front and rear axles. The attachment of both fixed and adjustable length axles to the car body and tread members is achieved with simple pin connections to simplify not only initial assembly, but also disassemble for transport of the crane components from one job site to another and subsequent reassemble.

BRIEF DESCRIPTION OF THE DRAWINGS

FIG. 1 is a top plan view of the lower assembly of the crane showing the fixed length axle being utilized according to the present invention.

FIG. 2 is a view similar to FIG. 1, but showing an adjustable length axle arrangement of the present invention utilized with the crane of FIG. 1.

FIG. 3 is a section taken on line 3—3 of FIG. 2.

FIG. 4 is a section taken on line 4—4 of FIG. 3.

DETAILED DESCRIPTION

Referring now to FIG. 1, there is shown a lower assembly for a crane, indicated generally at 10, which basically is composed of car body 12, front and rear axles 14 and 16 and left and right tread members 18 and 20. The car body 12 has a turntable 22, including a bearing means, which provides the connection between the crane upper (not shown) and defines an axis of rotation 24 therebetween. In order to provide a symmetrical base for uniform stability of the crane, the tread members 18 and 20 are located equidistance from the axis of rotation 24 and each is centered on a line 26 extending through the axis of rotation perpendicular to the tread members. Each of the tread members 18 and 20 includes a track frame 28 with drive and idlers sprockets 30 and 32 respectively rotatably supported on the ends thereof. The drive sprockets 30 are independently driven, for example, by means of a reversable hydraulic motor 34, a spur gear reduction set 36 and a final planetary drive 38. An endless crawler track 40 is trained around, and engages the two sprockets 30 and 32. The car body 12 is provided with two pair of bifurcated ears; 42 and 44 on the front side, and 46 and 48 on the rear side thereof. The front axle has two lugs 50 and 52 which are interleafed between the bifurcated ears 42 and 44 respectively. The lugs and ears have alignable holes to permit pins to be inserted to effect a pin connection of the front axle 14 to the car body 12. Similarly, lugs 54 and 56 are pinned to ears 46 and 48 respectively to effect a pin connection of the rear axle 16 to the car body 12.

The front and rear axles have beam ends 60, 62 and 64, 66 respectively of rectangular cross sections which are received in picture frames or rectangular sockets 70, 72, 74 and 76 formed in the track frames 28; the ends 60 and 62 of the front axle 14 being received within picture frames 70 and 72 formed in the right and left track frames respectively and the ends 64 and 66 of the rear axle 16 being received within picture frame 74 and 76 formed in the right and left track frames respectively. The beam ends are held in place within their respective frames in conventional manner, such as by an adjustable wedge pack positioned on top of each beam, to engage the upper, inner surface of the associated picture frame, and pinned by dowels on diagonally opposite beam ends with longitudinal keys and keyways utilized with the remaining beam endings. The connection between each axle and the track frame is completed by pinning one end of a pair of adjustable length struts to each axle and the other end to the adjacent track frame. Thus, front axle 14 is pinned to struts 78 and 80 with the former pinned to the right track and the latter pinned to the left track. Similarly, strut 82 is pinned to rear axle 16 and to the track frame of the right tread member and strut 84 is pinned to the rear axle 16 and the left track frame.

The beam ends of each axle are offset from each other, as indicated at 86. Thus, picture frames 70 and 74 of the right track frame are positioned farther from the drive sprocket than the picture frames 72 and 76 of the left track frame, although the distances between picture frames on each track frame are equal. The offset 86 will be explained more fully hereinafter, but basically this offset is provided to accommodate the offset necessary due to the utilization of two hydraulic rams in the adjustable length axle version of the crane.

The adjustable length axle version is shown in FIGS. 2-4 and substitutes adjustable length axle 114 and 116 for the fixed length axles 14 and 16. Each of the axles 114 and 116 has an axle box 200 and 202 respectively. Lugs 150 and 152 secured to the front axle box 200 interleaf with the bifurcated ears 42 and 44 and are pinned thereto to effect connection between front axle 114 and car body 12. Similarly, lugs 154 and 156 interleaf with, and are pinned to ears 46 and 48 to effect connection between the rear axle 116 and the car body 12. The struts 78 and 80, and struts 82 and 84 are also connected to the axle boxes 200 and 202 respectively in the same manner, and for the same purpose as they were connected to axles 14 and 16. A pair of offset axle beams 204 and 206 are slideably mounted within individual rectangular chambers 212 and 214 formed in the front axle box 200. The rear axle box 202 is also provided with similar chambers 216 and 218, as best seen in FIGS. 3 and 4, with axle beams 208 and 210 slideably mounted therein. A first pair of hydraulic rams 220 and 222 and a second pair 224 and 226, are respectively mounted in the chambers of axle boxes 200 and 202 respectively; each ram being positioned within a chamber and having its base or head end pinned to the end of the associated axle box and its rod end pinned to the axle beam within that chamber. The offset or distance between the middle of the axle beams 204 and 206, as indicated at 86 in FIG. 2, is the same offset or distance between the middle of the ends 60 and 62 of the fixed length axle 14, as indicated at 86 in FIG. 1. Extension and retraction of each ram will cause the axle beam connected thereto to also extend and retract relative to the axle box.

Since the axle beams 204 and 208 are connected to the right track frame, and axle beams 206 and 210 to the left track frame, the right tread member will extend and retract, i.e. increase and decrease gage width, with simultaneous extension and retraction of the rams 220 and 224. Similarly the left tread member will extend and retract with simultaneous extension or retraction of the rams 222 and 226 acting on axle beams 206 and 210. The rams therefore must be connected in a hydraulic circuit to effect such simultaneous extension. Jacks 228, 230, 232 and 234 are attached to the axle boxes 200 and 202 and are extendable into engagement with the ground to lift the tread members from the ground so that the tread members may be extended or retracted. The length of struts 78, 80, 82 and 84 must change between wide and narrow gage. Thus, the struts are simply disconnected when a change in gage is to be made, the change effected and the struts manually adjusted to the proper length and reconnected.

In order to lock the tread members in either the wide or narrow gage, a locking pin with a frusto-conical end, such as shown at 236 in FIG. 3, engages one of two beveled holes 238 and 240 formed in the axle beam; axle beam 210 is shown as typical in FIG. 3. The locking pin 236 is positioned within the hole 238 when the ram 226 is extended to achieve a wide gage, as shown in FIG. 3. To achieve a narrow gage, i.e. move the tread member of FIG. 3 to the dotted line position, the pin 236 is first removed, the ram 226 retracted until the pin 236 is alignable with the hole 240 and the pin repositioned to engage hole 240 and retained therein.

Assembly of the adjustable axle, because of the size and weight of the components, can be difficult. To aid in such assembly, a bar 244 is fastened between the side walls of the axle beam 210. A guide member including a ramp 246 and locating member 248 is secured within the axle beam; with the ramp 246 engaging the lower, inner surface of the axle beam and the locating member 248 positioned to align the eye 249 of the rod of the ram 226 with a hole (not shown) in the axle beam 210 so that pin 250 may be inserted to secure the ram 226 to the axle beam 210. The procedure of assembly is to push the ram 226, with hydraulic connections at least temporarily made and the ram retracted, into the open end of the axle beam. The eye 249 will slide up the ramp 246 into engagement with the locating member 248. The pin 250 may then be inserted and locked in place. The ram 226 has been inserted over the top of the bar 244 which supports the ram 226 and may act as a fulcrum for any small vertical misalignment problems as the pin 250 is inserted. The assembled ram and axle beam is then inserted into the axle box 202 and the ram 226 extended so that the base end of ram 226 protrudes from the axle box. The base plate 252 is then pinned to the ram 226. Contraction of the ram and final positioning of the axle beam within the axle box will permit the plate 252 to be secured to the axle box, such as by bolts.

It will be appreciated that each of the fixed and adjustable length axles are mirror images of each other, which permits them to be rotated through 180° degrees and to thereby be interchangeable front to rear. This is especially useful because of the diagonally opposite wedge and dowel fastening arrangements discussed previously. From an economy standpoint, it means lower manufacturing costs, less parts to stock and warehouse, and better serviceability generally.

While one embodiment of the present invention has been shown and described herein, it will be appreciated that various changes and modifications may be made therein without departing from the spirit of the invention as defined by the scope of the appendant claims.

What is claimed is:

1. A method of initially assembling a hollow axle body, axle member and hydraulic ram to form an adjustable length axle comprising the steps of:
   securing a guide means and a cross bar inside said axle member;
   inserting the rod end of said ram while in a contracted condition into said axle member over the cross bar;
   sliding the rod end into position in said guide means;
   pinning said rod end to said axle member;
   inserting the ram and the axle member into said axle body;
   extending said ram to extend beyond said axle body;
   pinning said ram body to a base plate;
   contracting said ram to position said base plate against said axle body; and
   fastening said base plate to said axle body.

2. A crane having a carbody and left and right tread members, each of which has a drive sprocket, comprising:
   a pair of sockets in each tread member, the distance between sockets on each member being equal and the sockets in one member being farther from its drive sprocket that the sockets in the other member;
   front and rear pairs of ears on said carbody;
   a first pair of fixed length axles, each having socket-engaging ends defining a first offset in a fore and aft direction with respect to each other;
   a second pair of adjustable length axles, each having a hollow axle body with first and second axle members moveable therein and defining a second offset in a fore and aft direction and a hydraulic ram connected between each axle member and its associated axle body;
   pin means for connecting one of said first and second pair of axles to said ears; and
   means for securing said one pair of axles in said sockets.

3. An adjustable length axle for connecting a crane carbody and tread member having facing but offset sockets, comprising:
   an axle body defining a pair of side by side compartments alignable with said sockets;
   an axle member complementary to and slideable within each of said compartments;
   a pair of hydraulic rams having their head ends pinned to opposite sides of said axle body and their rod ends pinned to the associated axle member;
   a transverse bar connected to opposite side walls of each compartment to support each ram;
   a guide member secured in each of said axle members to locate the rod end of each member to facilitate pinning said rod end to the associated axle member; and
   retaining pins for locking said axle members relative to said axle body.

* * * * *